United States Patent
Gürtl

(10) Patent No.: US 12,326,231 B2
(45) Date of Patent: Jun. 10, 2025

(54) PROJECTION AND ILLUMINATION DEVICE FOR A MOTOR VEHICLE HEADLAMP

(71) Applicant: ZKW Group GmbH, Wieselburg (AT)

(72) Inventor: Josef Gürtl, Kilb (AT)

(73) Assignee: ZKW Group GmbH, Wieselburg (AT)

( * ) Notice: Subject to any disclaimer, the term of this patent is extended or adjusted under 35 U.S.C. 154(b) by 0 days.

(21) Appl. No.: 18/274,091

(22) PCT Filed: Feb. 1, 2022

(86) PCT No.: PCT/EP2022/052315
§ 371 (c)(1),
(2) Date: Jul. 25, 2023

(87) PCT Pub. No.: WO2022/171488
PCT Pub. Date: Aug. 18, 2022

(65) Prior Publication Data
US 2024/0418336 A1 Dec. 19, 2024

(30) Foreign Application Priority Data
Feb. 9, 2021 (EP) ..................... 21155997

(51) Int. Cl.
*F21S 41/40* (2018.01)
*F21S 41/265* (2018.01)
(Continued)

(52) U.S. Cl.
CPC ............ *F21S 41/40* (2018.01); *F21S 41/265* (2018.01); *F21V 5/007* (2013.01); *G02B 27/30* (2013.01);
(Continued)

(58) Field of Classification Search
CPC ......... F21V 5/007; F21S 41/40; F21S 41/151; F21S 41/265; G02B 27/30; G02B 3/0037–0075
See application file for complete search history.

(56) References Cited

U.S. PATENT DOCUMENTS 6,573,026 B1   6/2003  Aitken et al.
2005/0002105 A1*  1/2005  Nemoto ............... G02B 3/0056
                                                          359/619
(Continued)

FOREIGN PATENT DOCUMENTS

GB   2509764 A * 7/2014 ....... B29D 11/00307
WO   01/44871 A1   6/2001

OTHER PUBLICATIONS

Extended European Search Report Issued in European Patent Application No. 21193039.1, dated Nov. 16, 2021 (8 Pages).
(Continued)

*Primary Examiner* — Tracie Y Green
*Assistant Examiner* — Michael Chiang
(74) *Attorney, Agent, or Firm* — Eversheds Sutherland (US) LLP

(57) ABSTRACT

Projection device (10) for a motor vehicle headlight, wherein the projection device (10) comprises the following: a light entry micro-optics array (100), comprising micro entrance optics, a light emitting micro-optics array (200), comprising micro exit optics, a substrate layer (300), on which the at least one light entry micro-optics array (100) is arranged on a first side (310) of the substrate layer (300) and the at least one light emitting micro-optics array (200) is arranged on a second side (320), wherein respectively a micro entrance optic (110) and respectively precisely one associated micro exit optic (210) form a micro-optics (Continued)

Figure 1A:
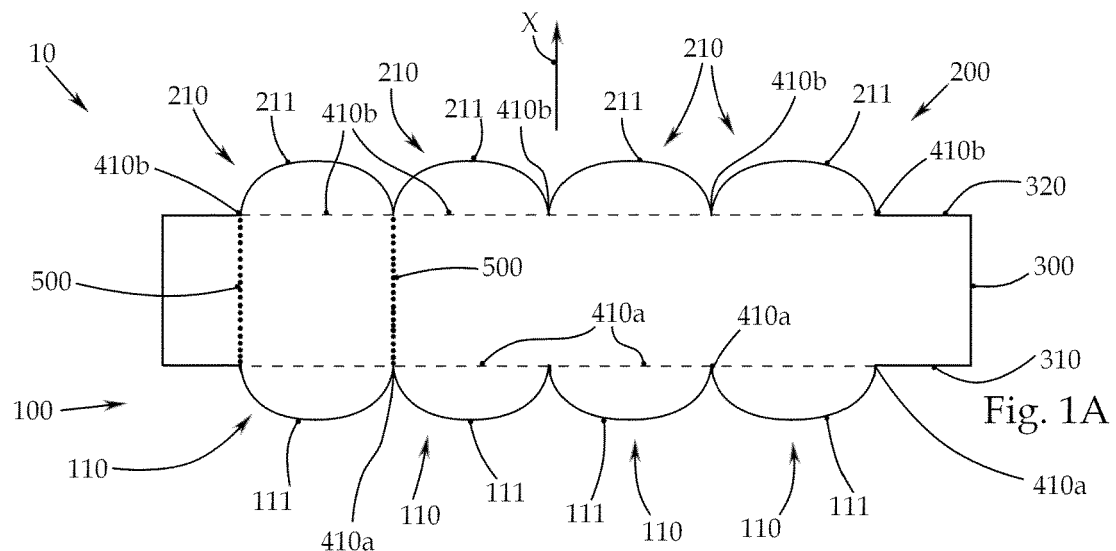

pair (400), wherein the light entry surface (111) of the micro entrance optic (110) and the first side (310) form a first marginal edge (410*a*) in a common surface section line, and wherein the light emitting surface (211) of the micro exit optic (210) and the second side (320) form a second marginal edge (410*b*) in a common surface section line, wherein the substrate layer (300) is made of translucent glass, wherein between adjacent micro-optics pairs (400), an interference structure (500) is arranged by means of a laser processing method in order to prevent light rays injected into one micro-optics pair (400) from crossing into an adjacent micro-optics pair (400), wherein the interference structure (500) extends substantially from the first marginal edge (410*a*) to the second marginal edge (410*b*) for each micro-optics pair (400).

14 Claims, 2 Drawing Sheets

(51) Int. Cl.
*F21V 5/00* (2018.01)
*G02B 27/30* (2006.01)
*F21S 41/151* (2018.01)
*F21Y 115/10* (2016.01)

(52) U.S. Cl.
CPC .......... *F21S 41/151* (2018.01); *F21Y 2115/10* (2016.08)

(56) References Cited

U.S. PATENT DOCUMENTS

| | | |
|---|---|---|
| 2006/0171033 A1 | 8/2006 | Schreder et al. |
| 2009/0122175 A1 | 5/2009 | Yamagata |
| 2016/0265733 A1 | 9/2016 | Bauer et al. |
| 2018/0320852 A1 | 11/2018 | Mandl |
| 2020/0080699 A1 | 3/2020 | Renaud et al. |
| 2021/0215314 A1* | 7/2021 | Schreiber ............... F21S 41/663 |
| 2021/0271003 A1* | 9/2021 | Yang ...................... G06V 40/12 |
| 2021/0333441 A1* | 10/2021 | Schwartz ............. G06V 10/147 |
| 2021/0341123 A1 | 11/2021 | Mototsuji |
| 2023/0366522 A1* | 11/2023 | Guinn .................. B60Q 1/2607 |

OTHER PUBLICATIONS

International Search Report and Written Opinion Issued in International Patent Application No. PCT/EP2022/052315. dated Apr. 8, 2022 (16 Pages).

\* cited by examiner

PROJECTION AND ILLUMINATION DEVICE FOR A MOTOR VEHICLE HEADLAMP

The invention relates to a projection device for a motor vehicle headlight, wherein the projection device is designed to project light in the form of at least one light distribution in a main emission direction, wherein the projection device comprises the following:

- at least one light entry micro-optics array, which has a plurality of micro entrance optics arranged in a matrix-like manner in a plane orthogonal to the main emission direction of the projection device and having a light entry surface, wherein the micro entrance optics are designed to inject light rays from a light source into the projection device via the respective light entry surface,
- at least one light emitting micro-optics array, which has a plurality of micro exit optics arranged in a matrix-like manner in a plane orthogonal to the main emission direction of the projection device and having a light emitting surface, wherein the micro exit optics are designed to emit light rays injected into the projection device from the projection device towards the main emission direction via the respective light emitting surface,
- a substrate layer, on which the at least one light entry micro-optics array is arranged on a first side of the substrate layer and the at least one light emitting micro-optics array is arranged on a second side of the substrate layer opposite the first side, wherein respectively a micro entrance optic of the light entry micro-optics array and respectively precisely one associated micro exit optic of the light emitting micro-optics array form a micro-optics pair, in that light rays injected into a micro entrance optic can be substantially emitted through the micro exit optic associated with the respective micro entrance optic, wherein the light entry surface of the micro entrance optic and the first side of the substrate layer form a first marginal edge in a common surface section line, and wherein the light emitting surface of the micro exit optic and the second side of the substrate layer form a second marginal edge in a common surface section line.

The invention further relates to a light module for a motor vehicle headlight, wherein the light module comprises the following:

- at least two light sources, which are designed to emit light rays,
- at least two collimators, which are designed to produce parallel light rays from the light sources, wherein each collimator is respectively associated with a light source, and wherein a light source and a collimator associated with the light source respectively form a light emission pair.

Moreover, the invention relates to an illumination device having at least one projection device according to the invention and at least one light module according to the invention.

Furthermore, the invention relates to a motor vehicle headlight having at least one illumination device according to the invention.

The invention further relates to a motor vehicle headlight having at least one projection device according to the invention or having at least one light module according to the invention.

"Main emission direction" means the direction in which the projection device emits the most or the strongest light as a result of its directionality. In order to produce light distributions for a motor vehicle, so-called "micro lens arrays" or MLAs for short are used, inter alia, in the prior art, wherein light sources are connected upstream of the MLA.

However, as light enters the MLA, light spillover occurs or light rays cross into adjacent lenses, which causes stray light, which is undesirable.

For light injection into the MLA, collimators are used to parallelize the light rays emitted by the light sources, which collimators are often manufactured in a coherent collimator array from one material to save costs, wherein a similar effect of light from one collimator crossing into an adjacent collimator occurs, creating stray light or light rays thereby entering an unwanted lens in the MLA.

Given that it is not possible to install otherwise typical dividers in a coherent collimator array made of one material as this entails further working steps and thus also increases costs, other solutions must be found. External dividers between the collimators also require additional installation space, which reduces the effectiveness of the collimators.

It is an object of the invention to provide an improved projection device.

This object is achieved by virtue of the fact that the substrate layer is made of translucent glass, wherein between adjacent micro-optics pairs, an interference structure is arranged in the substrate layer made of glass by means of a laser processing method in order to prevent light rays injected into one micro-optics pair from crossing into an adjacent micro-optics pair, wherein the interference structure extends substantially from the first side of the substrate layer to the second side of the substrate layer.

It can be provided that the interference structure extends substantially from the first marginal edge to the second marginal edge in each micro-optics pair.

It can be provided that the light entry micro-optics array and the light emitting micro-optics array are firmly connected to the substrate layer.

It can be provided that the light entry micro-optics array, the light emitting micro-optics array and the substrate layer are made in one piece from translucent glass.

It can be provided that the interference structure is designed as micro-cracks, wherein the average length of the micro-cracks is preferably in the range of 50-150 μm.

It can be provided that the interference structure is designed as a plurality of holes, wherein a hole preferably has a diameter of up to 5 μm.

It can be provided that the holes are filled with a light-absorbing material.

It can be provided that the interference structure for each micro-optics pair extends from the first marginal edge in the shortest connection to the second marginal edge and as a whole substantially forms a cylindrical shape such that light rays that enter the micro entrance optic only exit the micro exit optic of the corresponding micro-optics pair.

It can be provided that the interference structure for each micro-optics pair extends substantially from the first side to the second side of the substrate layer and as a whole substantially forms a square, rectangular or hexagonal prism or an elliptical cylinder such that light rays that enter the micro entrance optic only exit the micro exit optic of the corresponding micro-optics pair.

It is also an object of the invention to provide an improved light module.

This object is achieved by virtue of the fact that the collimators are interconnected via connecting sections and form a collimator array, wherein the collimators are formed as an integral collimator array and made of a single translucent material, and wherein between adjacent collimators in the connecting sections of the collimator array, an interference structure is introduced into the material by means of a laser processing method for light delimitation, which interference structure is designed to prevent light rays injected into one collimator from crossing into an immediately adjacent collimator.

Such connecting sections are created during the production of the collimator array from one material and are, for example, so-called connections or intersections during the injection moulding process, whereby the light to be injected can be injected from one collimator into an adjacent collimator.

It can be provided that the material is a carbonaceous material, wherein the interference structure is designed as a carbonization layer.

It can be provided that the collimator array is made of polycarbonate.

It can be provided that the light sources are designed as light-emitting diodes (LEDs).

It can be provided that the LEDs can be controlled individually and switched on and off individually and be dimmed independently of one another. The light module can comprise a control device for control.

It is also an object of the invention to provide an improved illumination device.

This object is achieved by an illumination device having at least one projection device according to the invention and at least one light module according to the invention, wherein each micro-optics pair of the projection device is associated with exactly one light emission pair of the light module, wherein the projection device and the light module are arranged relative to one another such that light rays emitted by a light emission pair can be injected precisely into the micro-optics pair of the projection device associated with the respective light emission pair.

The object is also achieved by a motor vehicle headlight having at least one illumination device according to the invention.

The object is also achieved by a motor vehicle headlight having at least one projection device according to the invention and at least one light module according to the invention.

Figure 2:
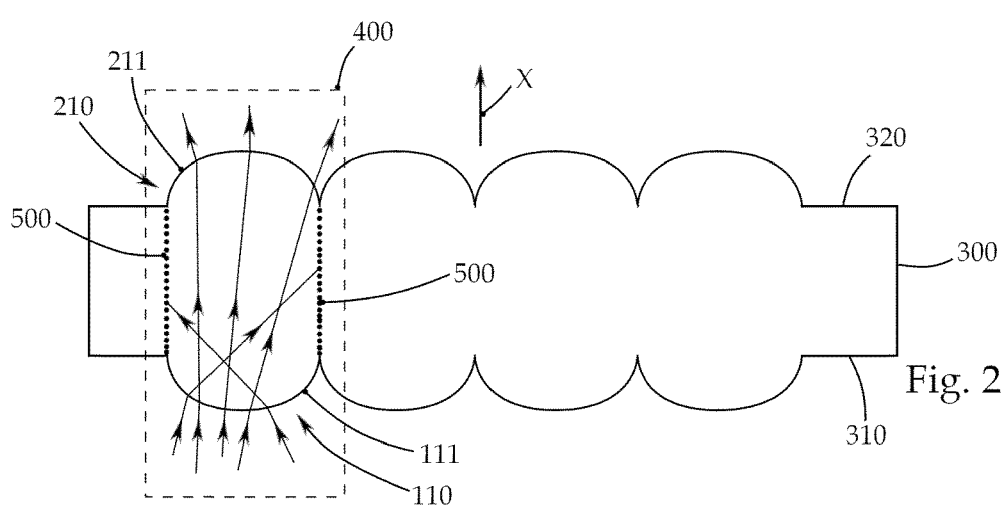
Figure 3:
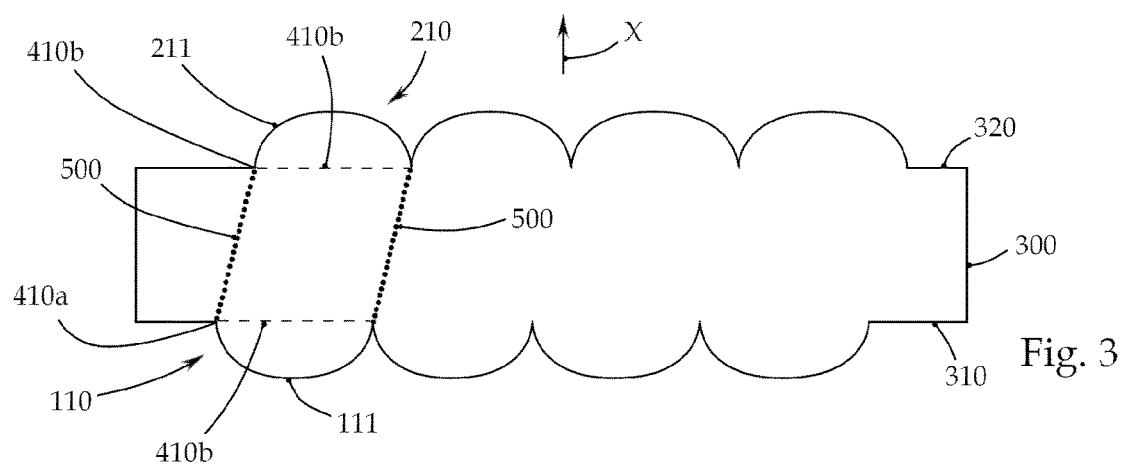
Figure 4:
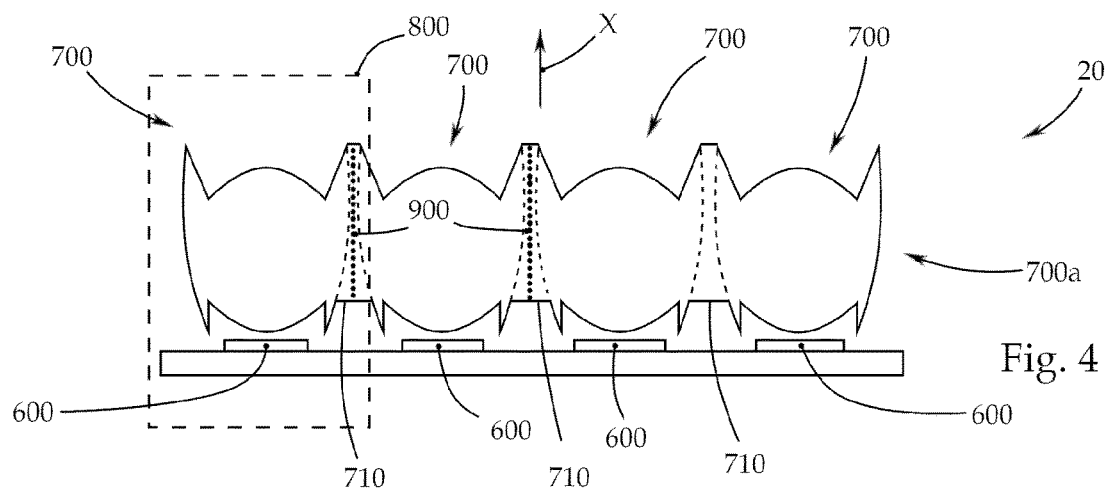
Figure 5:
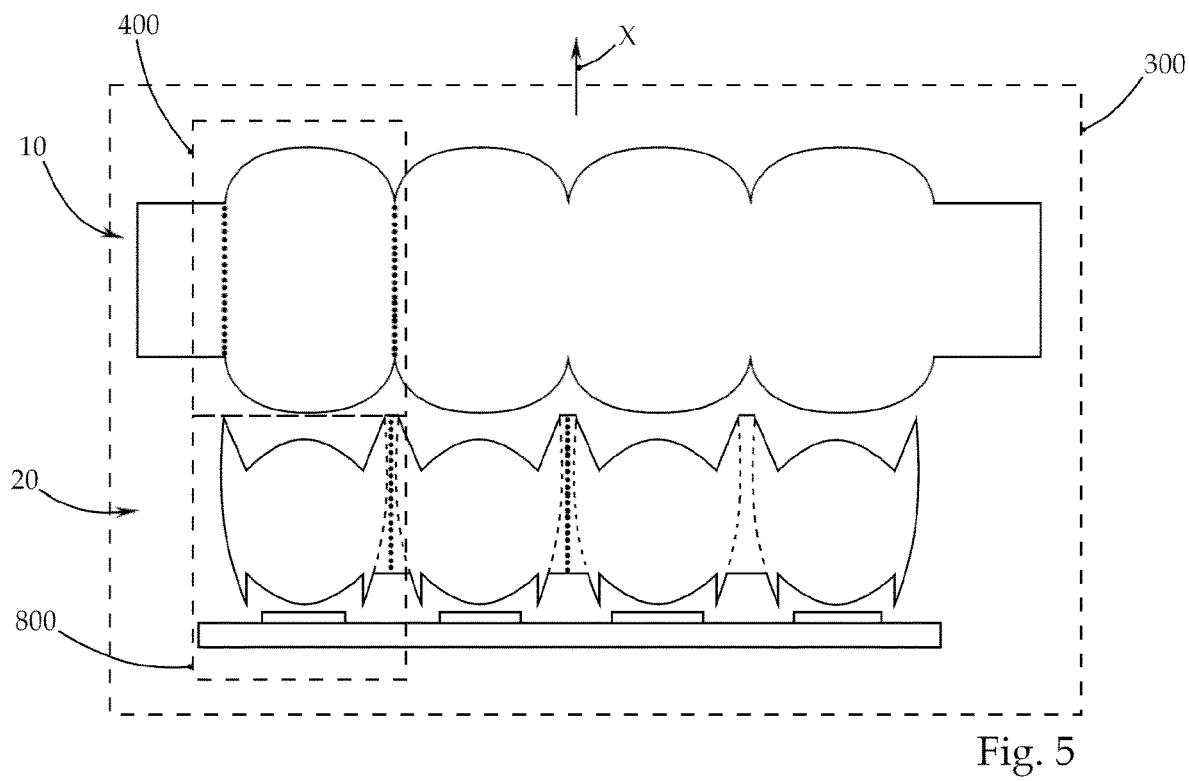

The invention is explained below in more detail based on exemplary drawings. In the drawings, FIG. 1A shows an exemplary projection device in a side view, formed from a substrate layer with a light entry micro-optics array, comprising a plurality of micro entrance optics, and a light emitting micro-optics array, comprising a plurality of micro exit optics, wherein an interference structure is arranged in the substrate layer by means of a laser processing method, FIG. 1B shows the projection device from FIG. 1A in a plan view, FIG. 2 shows the projection device from FIGS. 1A and 1B, wherein a micro-optics pair is shown, which is respectively formed by one micro entrance optic and exactly one micro exit optic, FIG. 3 shows a further example of a projection device in a side view, FIG. 4 shows an exemplary light module, comprising a collimator array and a plurality of light sources, in a side view, and FIG. 5 shows an exemplary illumination device, comprising a projection device according to FIGS. 1A, 1B and 2, as well as a light module according to FIG. 4.

Figure 1B:
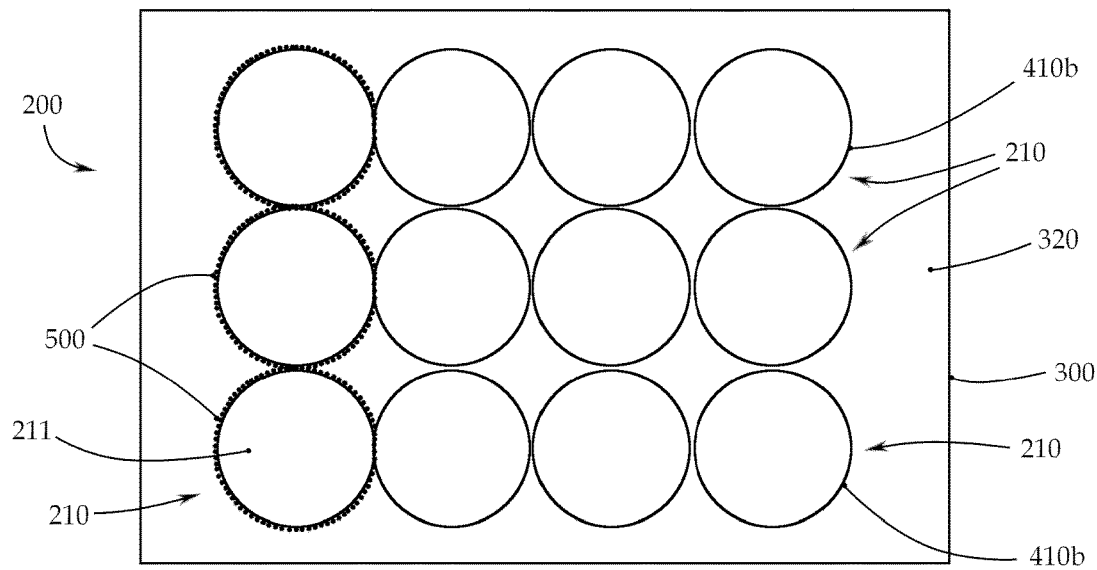

FIG. 1A and FIG. 1B show an exemplary projection device 10 for a motor vehicle headlight, wherein the projection device 10 is designed to project light in an area in front of a motor vehicle in the form of at least one light distribution in a main emission direction X.

In the example shown, the projection device 10 comprises a light entry micro-optics array 100, which has a plurality of micro entrance optics 110 arranged in a matrix-like manner in a plane orthogonal to the main emission direction X of the projection device 10 and having a light entry surface 111, wherein the micro entrance optics 110 are designed to inject light rays from a light source into the projection device 10 via the respective light entry surface 111.

The projection device 10 further comprises a light emitting micro-optics array 200, which has a plurality of micro exit optics 210 arranged in a matrix-like manner in a plane orthogonal to the main emission direction X of the projection device 10 and having a light emitting surface 211, wherein the micro exit optics 210 are designed to emit light rays injected into the projection device 10 from the projection device 10 towards the main emission direction X via the respective light emitting surface 211.

The projection device 10 further comprises a substrate layer 300, on which the one light entry micro-optics array 100 is arranged on a first side 310 of the substrate layer 300 and the one light emitting micro-optics array 200 is arranged on a second side 320 of the substrate layer 300 opposite the first side 310. The light entry micro-optics array 100 and the light emitting micro-optics array 200 are made of translucent acrylate.

Respectively a micro entrance optic 110 of the light entry micro-optics array 100 and respectively precisely one associated micro exit optic 210 of the light emitting micro-optics array 200 form a micro-optics pair 400, in that light rays injected into a micro entrance optic 110 can be substantially emitted through the micro exit optic 210 associated with the respective micro entrance optic 110, as illustrated in FIG. 2.

Furthermore, the light entry surface 111 of the micro entrance optic 110 and the first side 310 of the substrate layer 300 form a first marginal edge 410a in a common surface section line, wherein the light emitting surface 211 of the micro exit optic 210 and the second side 320 of the substrate layer 300 form a second marginal edge 410b in a common surface section line, as shown in FIG. 1A and FIG. 1B.

Between adjacent micro-optics pairs 400, an interference structure 500 is arranged in the substrate layer 300 made of glass by means of a laser processing method in order to prevent light rays injected into one micro-optics pair 400 from crossing into an adjacent micro-optics pair 400, wherein the interference structure 500 extends substantially for each micro-optics pair 400 from the first marginal edge 410a in the shortest connection to the second marginal edge 410b and as a whole substantially forms a cylindrical shape such that light rays that enter the micro entrance optic 110 only exit the micro exit optic 210 of the corresponding micro-optics pair 400. The cylindrical shape is shown in FIG. 1 in combination with FIG. 1B.

A further example of an arrangement of the interference structure 500 is shown in FIG. 3, wherein the light emitting micro-optics 210 are shifted orthogonally to the main emission direction X.

The interference structure 500 is designed as microcracks, wherein the average length of the micro-cracks is in the range of 50-150 μm. The interference structure 500 can further be designed as a plurality of holes, wherein a hole has a diameter of up to 5 μm and the holes are filled with a light-absorbing material.

FIG. 4 shows an exemplary light module 20 for a motor vehicle headlight, wherein the light module 20 comprises a plurality of light sources 600, which are designed to emit light rays.

Furthermore, the light module 20 comprises a plurality of collimators 700, which are designed to produce parallel light rays from the light sources 600, wherein each collimator 700 is respectively associated with a light source 600, and wherein a light source 600 and a collimator 700 associated with the light source 600 respectively form a light emission pair 800, as shown by the dashed rectangle in FIG. 4.

The collimators 700 are interconnected via connecting sections 710 and form a collimator array 700a, wherein the collimators 700 are formed as an integral collimator array 700a and made of a single translucent material. Although not shown in the figures, the collimator array 700a is arranged in rows and columns similar to the micro-optics arrays, as shown in FIG. 1B for example.

Between adjacent collimators 700 in the connecting sections 710 of the collimator array 700a, an interference structure 900 is respectively introduced into the material by means of a laser processing method for light delimitation, which interference structure 900 is designed to prevent light rays injected into one collimator 700 from crossing into an immediately adjacent collimator 700. The translucent material is a carbonaceous material—polycarbonate in the example shown. The interference 900 is designed as a carbonization layer.

FIG. 5 shows an exemplary illumination device 30 for a motor vehicle headlight, wherein the illumination device 30 has a light module 20 according to the example shown from FIG. 4 and a projection device 10 according to the example shown from FIGS. 1A, 1B and 2.

Each micro-optics pair 400 of the projection device 10 of the illumination device 30 is associated with exactly one light emission pair 800 of the light module 20, wherein the projection device 10 and the light module 20 are arranged relative to one another such that light rays emitted by a light emission pair 800 can be injected precisely into the micro-optics pair 400 of the projection device 10 associated with the respective light emission pair 800.

The invention claimed is:

1. An illumination device (30) for a motor vehicle headlight, comprising:
    a projection device (10) which is configured to project light in the form of at least one light distribution in a main emission direction (X), the projection device (10) comprising:
        at least one light entry micro-optics array (100), which has a plurality of micro entrance optics (110) arranged in a matrix-like manner in a plane orthogonal to the main emission direction (X) of the projection device (10) and having a light entry surface (111), wherein the micro entrance optics (110) are designed to inject light rays from a light source into the projection device (10) via the respective light entry surface (111);
        at least one light emitting micro-optics array (200), which has a plurality of micro exit optics (210) arranged in a matrix-like manner in a plane orthogonal to the main emission direction (X) of the projection device (10) and having a light emitting surface (211), wherein the micro exit optics (210) are designed to emit light rays injected into the projection device (10) from the projection device (10) towards the main emission direction (X) via the respective light emitting surface (211); and
        a substrate layer (300), on which the at least one light entry micro-optics array (100) is arranged on a first side (310) of the substrate layer (300) and the at least one light emitting micro-optics array (200) is arranged on a second side (320) of the substrate layer (300) opposite the first side (310);
        wherein respectively a micro entrance optic (110) of the light entry micro-optics array (100) and respectively precisely one associated micro exit optic (210) of the light emitting micro-optics array (200) form a micro-optics pair (400), in that light rays injected into a micro entrance optic (110) are substantially emitted through the micro exit optic (210) associated with the respective micro entrance optic (110), wherein the light entry surface (111) of the micro entrance optic (110) and the first side (310) of the substrate layer (300) form a first marginal edge (410a) in a common surface section line, and wherein the light emitting surface (211) of the micro exit optic (210) and the second side (320) of the substrate layer (300) form a second marginal edge (410b) in a common surface section line,
        wherein the substrate layer (300) is made of translucent glass, wherein between adjacent micro-optics pairs (400), an interference structure (500) is arranged in the substrate layer (300) made of glass by means of a laser processing method in order to prevent light rays injected into one micro-optics pair (400) from crossing into an adjacent micro-optics pair (400), wherein the interference structure (500) extends substantially from the first side (310) of the substrate layer (300) to the second side (320) of the substrate layer (300); and
    at least one light module (20), wherein the at least one light module (20) comprises:
        at least two light sources (600), which are designed to emit light rays,
        at least two collimators (700), which are designed to produce parallel light rays from the at least two light sources (600), wherein each collimator (700) is respectively associated with one of the at least two light sources (600), and
    wherein a light source (600) and a collimator (700) associated with the light source (600) respectively form a light emission pair (800), wherein the collimators (700) are interconnected via connecting sections (710) and form a collimator array (700a), wherein the collimators (700) are formed as an integral collimator array (700a) and made of a single translucent material, and wherein between adjacent collimators (700) in the connecting sections (710) of the collimator array (700a), an interference structure (900) is introduced into the material by means of a laser processing method for light delimitation, which interference structure (900) is designed to prevent light rays injected into one collimator (700) from crossing into an immediately adjacent collimator (700), and
    wherein each micro-optics pair (400) of the projection device (10) is associated with exactly one light emission pair (800) of the light module (20), wherein the projection device (10) and the light module (20) are arranged relative to one another such that light rays emitted by a light emission pair (800) can be injected precisely into the micro-optics pair (400) of the projection device (10) associated with the respective light emission pair (800).

2. The illumination device according to claim 1, wherein the interference structure (500) extends substantially from the first marginal edge (410a) to the second marginal edge (410b) in each micro-optics pair (400).

3. The illumination device according to claim 1, wherein the light entry micro-optics array (100) and the light emitting micro-optics array (200) are firmly connected to the substrate layer (300).

4. The illumination device according to claim 1, wherein the light entry micro-optics array (100) and the light emitting micro-optics array (200) are made of translucent acrylate.

5. The illumination device according to claim 1, wherein the interference structure (500) is designed as micro-cracks.

6. The illumination device according to claim 5, wherein the micro-cracks have an average length in the range of 50-150 μm.

7. The illumination device according to claim 1, wherein the interference structure (500) is designed as a plurality of holes.

8. The illumination device according to claim 7, wherein the holes are filled with a light-absorbing material.

9. The illumination device according to claim 7, wherein the plurality of holes comprises at least one hole which has a diameter of up to 5 μm.

10. The illumination device according to claim 1, wherein the interference structure (500) for each micro-optics pair (400) extends from the first marginal edge (410a) in the shortest connection to the second marginal edge (410b) and as a whole substantially forms a cylindrical shape such that light rays that enter the micro entrance optic (110) only exit the micro exit optic (210) of the corresponding micro-optics pair (400).

11. The illumination device according to claim 1, wherein the interference structure for each micro-optics pair (400) extends substantially from the first side (310) to the second side (320) of the substrate layer (300) and as a whole substantially forms a square, rectangular or hexagonal prism such that light rays that enter the micro entrance optic (110) only exit the micro exit optic (210) of the corresponding micro-optics pair (400).

12. The illumination device according to claim 1, wherein the material of the collimators of the light module (20) is a carbonaceous material, wherein the interference structure (900) is designed as a carbonization layer.

13. The illumination device according to claim 1, wherein the collimator array (700a) is made of polycarbonate.

14. A motor vehicle headlight having at least one illumination device (30) in accordance with claim 1.

* * * * *